Nov. 20, 1928.
M. J. WEBER
1,692,102
WEIGHING SCALE, LEAF SPRING TYPE
Filed June 5, 1926    3 Sheets-Sheet 2
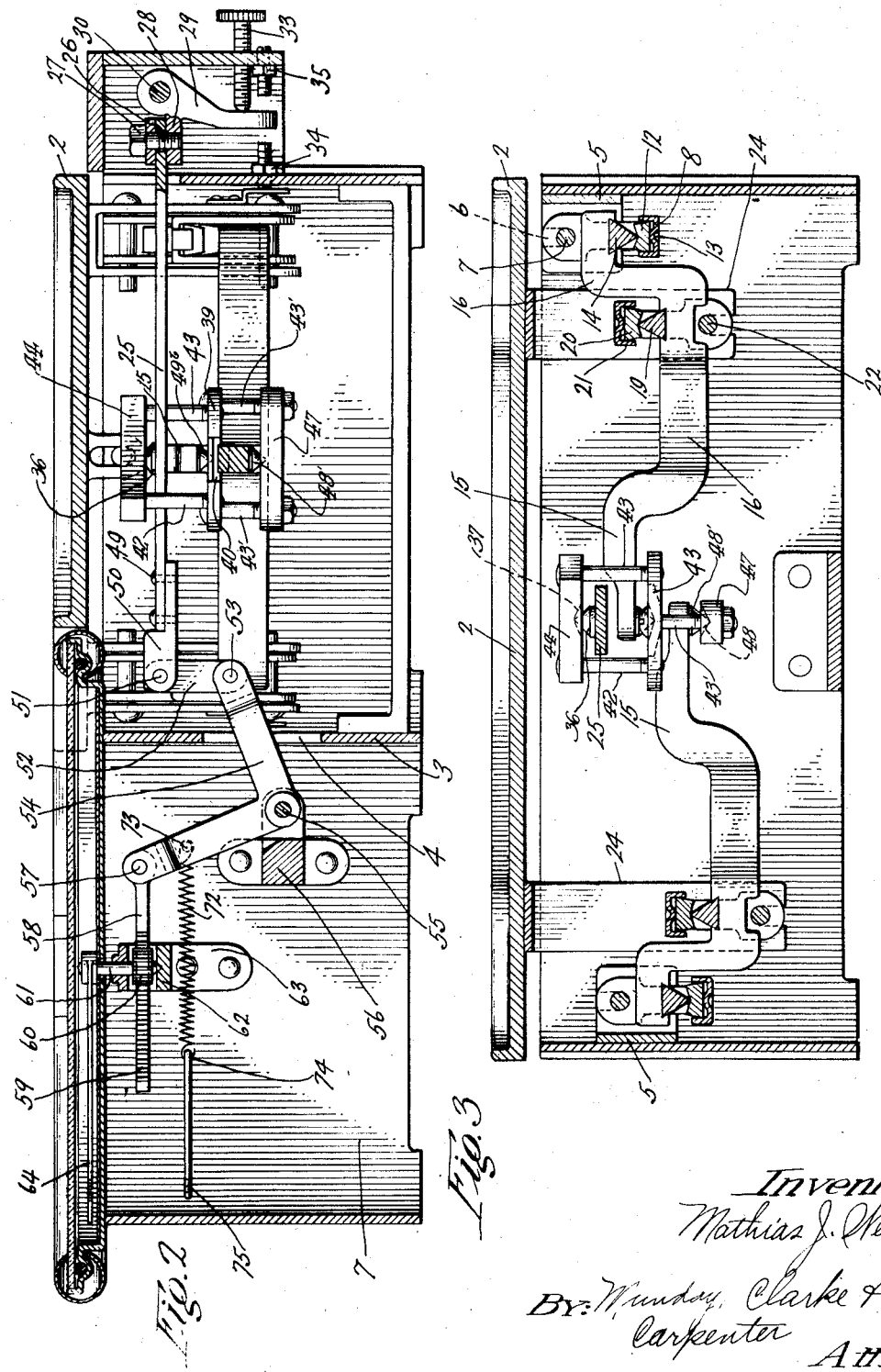

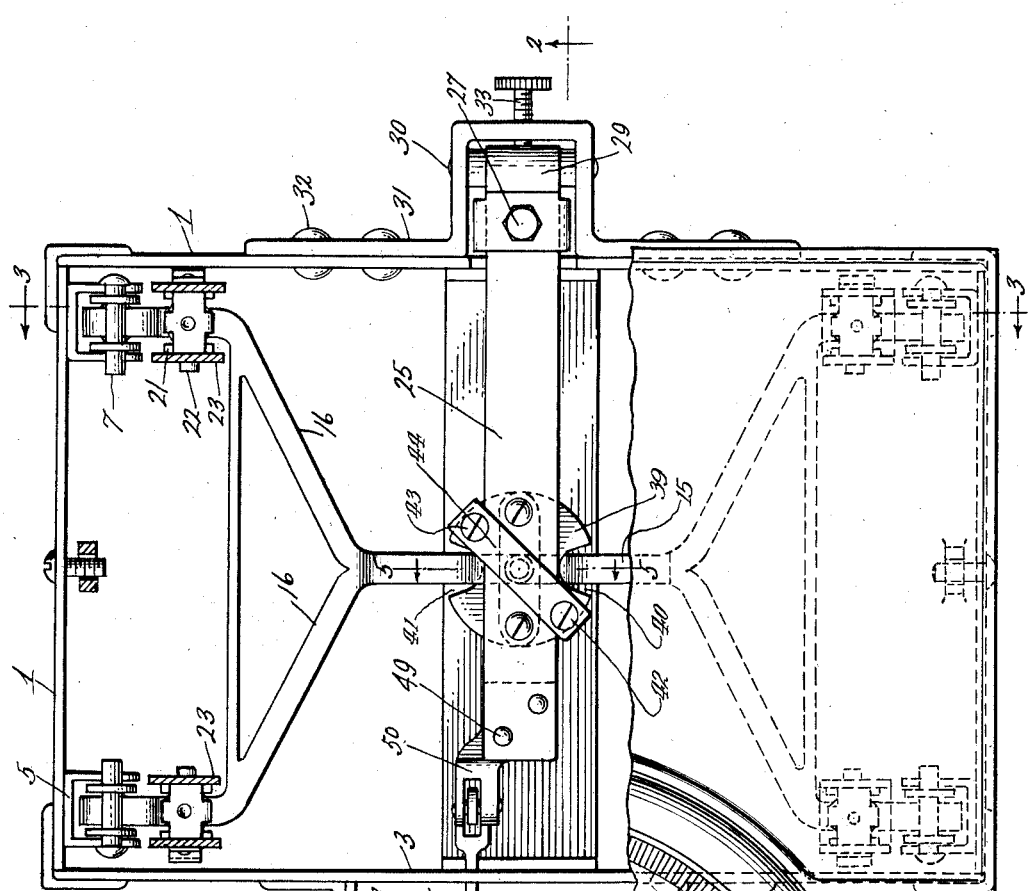

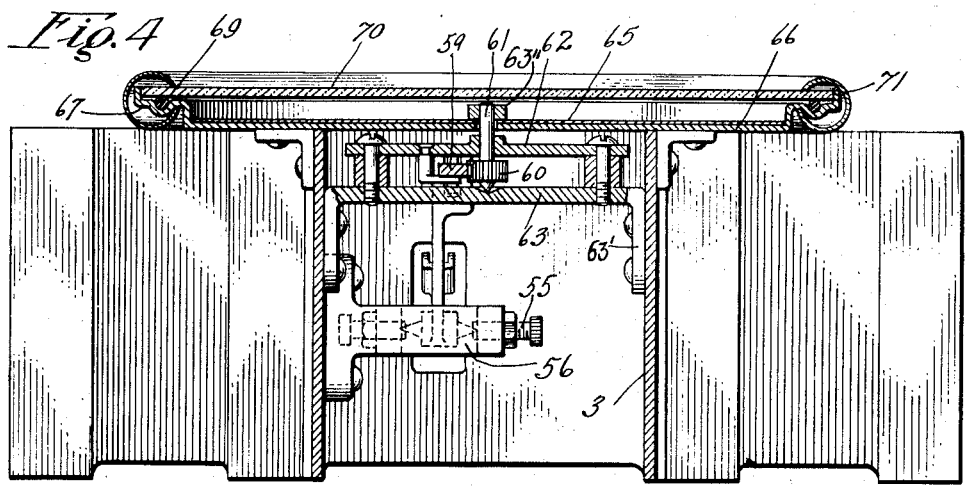
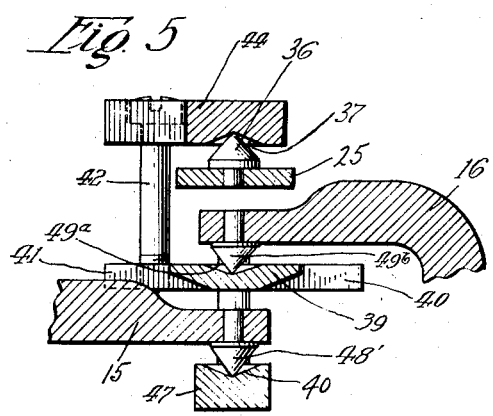
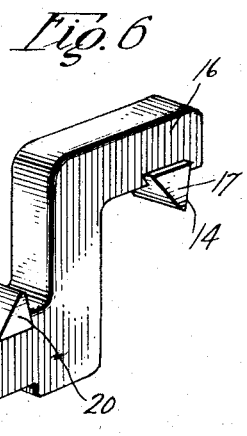
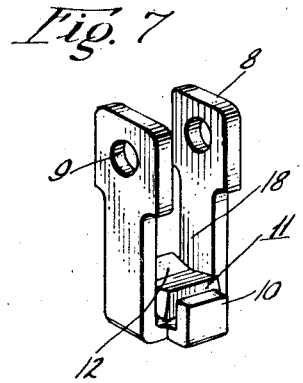

Patented Nov. 20, 1928.

1,692,102

UNITED STATES PATENT OFFICE.

MATHIAS J. WEBER, OF CHICAGO, ILLINOIS, ASSIGNOR TO HEALTHOMETER COMPANY, OF CHICAGO, ILLINOIS, A CORPORATION OF ILLINOIS.

WEIGHING SCALE, LEAF-SPRING TYPE.

Application filed June 5, 1926. Serial No. 113,835.

This invention relates to scales for weighing individuals and particularly to scales of the so-called bathroom type which are shallow and their top surfaces formed as a platform and as a registering dial so that the person to be weighed may very easily step upon the platform and glance down to the registering dial to view his indicated weight.

One of the objects of my invention resides in providing an extremely shallow scale of this type to permit one to easily step upon the platform and to prevent the scale from tipping when stepped upon, wherein the weighing and registering mechanism is compactly arranged within the shallow frame of the scale and wherein this mechanism provides maximum accuracy in the weighing operation.

Another object of my invention resides in providing the weighing and registering mechanism of a scale of the foregoing type, with a single leaf spring which functions not only as the spring of the scale but also as a reducing lever whereby to reduce the load transmitted from the weighing platform to the registering dial.

Another object of my invention resides in providing this leaf spring with a pivotal mounting together with an adjustment for raising or lowering the normal horizontal position of the lever to adjust the normal position of the shiftable pointer on the registering dial.

Still another object of my invention resides in providing a scale of the above character including the single leaf spring and an adjustable connection from the spring to the link connected to the bell crank lever which operates the rack thereby permitting the lengthening or shortening of the motion transmitted to the dial of the registering scale and to thereby vary the throw of the same.

Another object of my invention resides in the means for restricting the travel of the raising and depressing movements of the substantially horizontally disposed leaf spring to thereby prevent the travel of the rack bar, which operates the pointer, beyond a predetermined point in either direction as the bar engages the pointer operating pinion; this portion of the invention also includes the adjustment of these stops.

Yet another object of my invention resides in providing a plurality of horizontally disposed levers pivotally hung from the scale casing and supporting the scale platform together with a horizontally mounted single leaf spring connected to said horizontal levers, and operating connections from the leaf spring to the registering dial whereby the platform in the weighing operation is always maintained level and the reduced weight is transmitted with the minimum friction and with accuracy to the registering mechanism.

Yet another object of my invention resides in the novel frictionless mounting and connection between the before-mentioned horizontally disposed levers and my pivotally mounted, horizontally disposed single leaf spring.

Numerous other objects and advantages of the invention will be apparent as it is better understood from the following description, which, taken in connection with the accompanying drawings, discloses a preferred embodiment thereof.

Referring to the drawings,

Fig. 1 discloses a plan view with certain parts broken away to show the interior mechanim, Fig. 2 is a view on line 2—2 of Fig 1, Fig. 3 is a view on line 3—3 of Fig. 1, Fig. 4 is a section taken through the frame substantially at the junction of the frame proper and the extension housing the registering dial, Fig. 5 is a detailed section of my improved frictionless mounting connecting the leaf spring and the horizontally disposed levers, Fig. 6 is an elevational view of one of the ends of the horizontal levers, Fig. 7 is a perspective view of one of my saddles or stirrups which carries the bearing adapted to receive the knife edge of a lever.

This application embraces certain features of construction specifically disclosed and claimed in a co-pending application filed by me. In this co-pending application, among other things, the horizontally disposed levers and their pivotal mountings are described and claimed in connection with a horizontally disposed pivotally mounted lever which connects with the horizontal lever and with the registering mechanism, which includes a coil spring. In the present application these horizontally disposed levers are disclosed and claimed in connection with and in combination with a single leaf spring which replaces the horizontally disposed lever and the coil spring.

In the present type of scale, which is properly known as a bathroom scale, it is essential that the scale be constructed as shallow as possible so that the weighing platform, which forms a top for the scale casing, is of substantial width and length and is as close as possible to the ground or floor so that it can be easily stepped upon by individuals and so that there will be no danger of the scale tipping when stepped upon. In addition, it is important that the registering dial, which also forms a top for the scale frame, be arranged so that it preferably lies in the same horizontal plane with the scale platform and is arranged so that the registering mechanism can be easily discerned when the operator glances downwardly into the face of the dial.

In constructing my improved scale of such shallow dimensions it has been necessary to overcome numerous structural problems relating to the arrangement of levers, weighing and registering mechanism so as to provide a combination promoting compactness, stability, and accuracy, together with the elimination of friction, vibration, and twisting and straining torques which tend to register themselves on the dial during a weighing operation.

In general, my improved scale comprises a rigid metallic casing 1 preferably rectangular, relatively long and broad, and very shallow. This casing houses the hereinafter described horizontal levers and also the single leaf spring. The top of the casing is closed by a scale platform 2 which is coextensive with the cross section of the casing 1 proper, thus to provide a platform of generous dimensions. In addition, the casing 1 is provided with an extension 3 projecting laterally therefrom and communicating therewith by means of an aperture 4 in the extension 3 so that the operating mechanism may connect the leaf spring and the casing 1 and certain registering mechanism mounted in the extension 3. The top of the extension is closed by means of a registering dial hereinafter more specifically referred to, which registering dial is disposed so as to lie substantially in the same horizontal plane with the scale platform 2. This provides a very pleasing and finished construction and prevents the interpositioning of any object between the weighing scale and the registering dial and also facilitates the exclusion of dirt and foreign matter from the casing at the junction of the platform and the registering dial. In addition, by having the registering dial in this same plane the shallowness of the entire scale is carried out.

The weighing platform is carried by two horizontally disposed levers which are pivotally mounted in swinging stirrups carried by the casing. To this end the casing 1 is provided with brackets 5 riveted or otherwise secured to the side wall of the casing, and these brackets, as shown in Fig. 1, are substantially U-shaped and are provided with open ended slots 6 at their upper ends (see Fig. 3). These slots receive pivotal pins 7 carrying stirrups or saddles 8, for registering apertures 9 through which the pins 7 project. In this manner the stirrups 8 are swingingly mounted in the brackets 5. Each of these stirrups is also substantially U-shaped and is provided at its bottom with a seat formed by outstanding lugs 10 so that a bearing 11, having a V-shaped hardened surface 12 on its upper side, may seat therein. By means of this construction these bearings are prevented from falling out. The bottom portion of the seat of each of these bearings is provided with an upwardly punched tit 13 upon which the bottom of the bearing 12 may rock in any direction. As shown clearly in Fig. 3, this bearing 12 receives a knife edge 14 carried on the under side of the extreme end of each of the horizontally disposed levers 15. These levers are arranged in pairs at opposite sides of the casing and each lever 15 is provided with an intermediate shank and two furcations 16, each end of a furcation having on its outer end the knife edge 14. In this manner the outer ends of the levers 15 are pivotally mounted on the casing 1 by means of the swinging stirrups 8 and in this manner the levers are free to swing not only in the direction of the swinging movements of the stirrups 8 but also are free to rock by means of the tits 13 on the bearings 12 carried by the stirrups. This construction eliminates friction. In addition, the knife edges 14 are provided with side portions 17 which flare outwardly or are inclined, and these inclined sides 17 engage hardened walls 18 of the stirrups 8, by which construction only a slight contact or a single line of contact is permissible between these knife edges 14 and the sides of the stirrups 8. This further reduces friction. At a point somewhat spaced from the outer ends, the branch ends 16 of the levers 15 are provided on their upper faces with knife edges 19 which likewise are provided with flaring faces 20 which engage similar hardened walls of invertedly arranged stirrups hereinafter referred to. These knife edges support V-shaped bearings 20 mounted in inverted stirrups 21 identical in construction with the stirrup 8 shown in Fig. 7, and which stirrups are carried by cross pins 22 passing through aperturing bores in the lower ends of the stirrups 21. These pins 22 project slightly beyond the outer ends of the stirrups and are adapted to receive slotted ends 23 of brackets 24 depending from the under side of the platform. By means of this construction the platform is frictionlessly mounted on the knife edges 19 of the horizontal levers 15, so that the scale platform is mounted in a horizontal and level position whether or not the scale casing 1 is tipped to one side or whether or not the individual steps on any particular portion of the platform. The foregoing construction of the horizontally disposed levers, the stirrups and their mountings, is disclosed and claimed in my hereinbefore described co-pending application and, except for the combination claims of these horizontal levers with my improved leaf spring and with certain other features hereinafter described, no further particular description will be made in this case of these horizontal levers and their mountings, nor will they be specifically claimed herein. The inner ends of these two levers 15 are connected to and cooperate with a single leaf spring 25. This leaf spring has two function; first, that of returning the horizontal levers 16 to their normal or uppermost position, and second, the leaf spring acts as a reducing arm whereby to reduce the load on the meeting point of the horizontal levers 16 to a lower figure and to transmit it to the recording dial. For instance, if a weight of 400 pounds is placed on the scale platform the two levers 16 will reduce it about one-fourth so that at the junction of the two levers there will be about 100 pounds. If the spring 25 were not present these levers could not return to raised position after being depressed. Therefore it is necessary to have some sort of spring present, and instead of having a coiled spring, as in my prior constructions, in the present case I provide a single leaf spring, and this leaf spring 16 is arranged in the form of a lever pivotally mounted on the side of the casing and projecting over the junction of the two horizontal levers 16 and connected thereto by a frictionless stirrup adapted to decrease friction to a minimum. This pivoted spring-lever arm further reduces the 100 pound weight, that is, this leaf furnishes the resistance to the 100 pound reduced weight and the amount of drop or travel in the end of the spring lever is transmitted by motion-conveying mechanism to the registering dial, thereby registering, in amount of movement of the pointer, the weight placed on the platform. In regard to the constructional details, this leaf spring 25 is provided at its inner end with an aperture 26 through which the spring is bolted by means of bolt 27 to a horizontal lug 28 integral with a lever 29 pivotally mounted as at 30 on a substantially U-shaped strip 31 riveted as at 32 to the casing. Means is provided for changing the initial adjustment of the lever 25 comprising an adjusting screw 33 threading through the strip 31 and engaging the lower end of the lever 29. In addition, means is provided for restricting the movement of this lever 29 comprising two threaded pins 34 and 35, the one projecting from the inner end of the casing 1 and the other projecting from the inner surface of the strip 31. These studs 34 and 35 have threaded thereon adjusting nuts which may be adjusted to provide stops against which the lever 29 abuts. By shifting the screw 33 the lever 29 is correspondingly shifted to raise or lower the opposite end of the spring lever 25 to shift it above or below a substantially horizontal position. The function of this shifting adjustment will be referred to hereinafter. The leaf spring 25 is provided substantially intermediate its length with a conical pivot 36 which may be hardened so as to engage a conical hardened cup 37 carried by a stirrup 38. This stirrup is constructed and arranged to form a frictionless connection between the leaf spring 25 and the extreme inner ends of the two horizontal levers 15 and 16. This stirrup comprises an intermediate substantially horizontally disposed disc 39 having its sides cut out as at 40 and 41 to permit the disc to swing in a horizontal plane without contacting with the sides of the lever 16, and this disc is provided with upstanding screws 42 and 43 carrying a cross bar 44 having on its under side the depending conical cup 37 adapted to rest in the hardened conical pivot 36 disposed in the upper face of the leaf spring 25. In addition, the horizontal disc 39 is provided on its under side with two depending screws 43' carrying a lower cross bar 47 which has in its upper surface a hardened conical depression 48. The lower bar 47 is arranged at an angle to the upper bar, and the lower bar receives a conical shaped hardened pivot 48' disposed on the under side of the lever 16, and the upper face of the disc member is provided with a hardened conical depression 49$^a$ adapted to receive a hardened conical pivot 49$^b$ disposed on the extreme end of the other lever 16. By means of this construction the extreme inner end of the two horizontal levers 16 and the leaf spring 25 are mounted in vertical superimposed relation and by reason of the conical pivots and depressions, the stirrup is free to shift slightly in a horizontal plane and is constructed and arranged to eliminate any friction in the connection between the leaf spring and the horizontal levers. Obviously other arrangements for connecting the lever spring 25 and the horizontal levers may be availed of. It will be noticed that by reason of my preferred arrangement it is not necessary to increase the height of the casing and that a shallow casing may be used in this construction by superimposing the horizontal lever on the leaf spring. The extreme free end of the pivoted lever 25 is connected to the registering mechanism, and to this end is provided with a slot through which pass adjusting screws 49 connecting to a link 50 pivotally connected as at 51 to another link 52 pivoted as at 53 to a bell crank lever 54 pivotally mounted as at 55 on a bracket 56 carried by the extension 3 of the casing. This bell crank lever in turn is provided with a pivotal connection 57 to rack bar 58, the teeth 59 of which mesh with a pinion 60 mounted on a vertically disposed shaft 61 carried in bearing 62 on a bracket 63 of the extension 3. The upper end of this shaft 61 is provided with a pointer 64 adapted to move angularly over a registering dial 65 carried by a scale band 66. This scale band is provided on its outer periphery with a horizontal flange 67 having a depression 68 in which is mounted a packing 69 for receiving a glass plate 70. A clamping ring 71 engages over the glass plate 70 and engages the under side of the scale pan 66 whereby to provide a water-tight joint. A coil spring 72 is connected as at 73 to the upper end of the bell crank lever 54, to an adjusting rod 74 threadedly carried as at 75 in extension 3. This spring pulls the upper end of lever 54 toward the extension whereby to take up slack. In addition, another coil spring 76 is connected to the rack bar at 77 and to an outstanding lug 78 carried on the upper end of the bell crank lever 54. This spring is arranged at an angle whereby to pull the rack bar into constant mesh with the pinion and thereby eliminate back lash. It will be noted that the spring is connected to no stationary parts so that the tension of the spring is constant. The pivotal mounting 55 of the bell crank lever 54 includes adjusting screws 79 to change the adjustment. It will also be noted that the bracket 63 carrying the bearing 62 for the vertical shaft 61 includes a substantially C-shaped member, the sides of which 63' are riveted to the walls 3 of the extension and that an upper bearing 63'' for the shaft 61 is superimposed upon this C-shaped bearing 63 by means of spacing blocks and bolts passing therethrough. This provides a very simple and economical construction.

Referring again to the adjusting lever 29 for the leaf spring 25, it will be noted that by raising or lowering the horizontal position of the lever the initial position of the rack bar with relation to the pinion may be varied and thus the setting of the dial pointer at zero or any predetermined point may be controlled. It also is important to note that by reason of the adjustable connection 49 between the free end of the lever and the bell crank 54 the motion transmitting arm of the leaf spring 25 may be lengthened or shortened and thereby vary the throw of the dial pointer on the scale. In addition, by means of the adjustments 34 and 35 I provide means for limiting the travel of the depending portion of the lever arm 29 which raises or lowers the leaf spring and thereby restricts the elevation or depression of the leaf spring and this in turn restricts the normal adjusting positions of the leaf spring whereby to limit the travel of the rack bar 59 beyond a desired point in either direction as it engages the pinion 61.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described the combination of a substantially shallow enclosing casing, a platform closing the top thereof, a registering dial lying substantially in the plane of the platform, a plurality of horizontally disposed levers pivotally mounted within the casing, a horizontally disposed lever-spring mounted within the casing, means interconnecting the inner ends of the horizontally disposed levers with the lever-spring, registering mechanism for the dial mounted in the casing, and means connecting the registering mechanism with the lever-spring.

2. In a device of the class described the combination of a relatively shallow casing having a platform and a registering dial mounted across the top thereof and lying substantially in a common plane, a plurality of horizontally disposed levers carried by said casing, a lever-spring pivotally mounted within said casing and normally horizontally disposed, means connecting said horizontally disposed levers and said lever-spring, registering mechanism for said dial, and motion transmitting means connecting said lever-spring with said registering mechanism.

3. In a device of the class described the combination of a relatively shallow casing having a platform and a registering dial mounted across the top thereof and lying substantially in a common plane, a plurality of horizontally disposed levers carried by said casing, a lever-spring pivotally mounted within said casing and normally horizontally disposed, means connecting said horizontally disposed levers and said lever-spring, registering mechanism for said dial, motion transmitting means connecting said lever-spring with said registering mechanism, and means for shifting said lever-spring about its pivotal mounting to vary the position of the registering mechanism.

4. In a device of the class described the combination of a relatively shallow casing, a plurality of horizontally disposed levers mounted therein, a platform and a registering dial closing the top of said casing and lying substantially in a common plane, a single leaf spring mounted in said casing, connections between said leaf spring and said horizontal levers, registering mechanism for said dial including a pivotally mounted bell crank lever, and motion transmitting means between one arm of said bell crank lever and said leaf spring including an adjustable connection for varying the throw of said bell crank lever.

5. In a device of the class described the combination of a casing, a scale platform and a registering dial closing the top thereof and mounted substantially in a common plane, a registering mechanism for the dial, a plurality of horizontally disposed levers within said casing, means for swingingly mounting said levers from said casing, a single leaf spring mounted in said casing and horizontally lying over the inner ends of said levers, a stirrup constructed and arranged to form a frictionless connection for hanging said levers from said leaf spring, and a motion transmitting mechanism connecting said leaf spring and said registering mechanism.

6. In a device of the class described the combination of a casing having a scale platform and a registering dial closing its top and lying in a substantially common plane, a plurality of levers pivotally mounted in brackets carried by the casing so as to depend therefrom, said levers being arranged substantially in a horizontal plane, and said levers carrying the scale platform, a leaf spring carried by the side of the casing and projecting over the free end of said levers, a stirrup, said stirrup and levers and leaf spring having hardened, conically disposed, interfitting portions to provide a frictionless mounting whereby the inner ends of said levers depend from said leaf spring, registering mechanism for the dial, and motion transmitting means from the leaf spring to the registering mechanism.

7. In a device of the class described the combination of a casing, a plurality of horizontally disposed levers pivotally mounted within said casing and carrying a scale platform, said scale platform closing the top of said casing, a dial lying in the common plane of the platform, said platform being carried by said levers, a leaf spring carried by said casing and projecting over said horizontal levers, a stirrup comprising a horizontally disposed member and upper and lower members, said stirrup members, said leaf spring, and the free ends of said horizontal levers being superimposed and provided with interfitting, frictionless bearings whereby to permit the free ends of said levers to be pivotally hung from said leaf spring, registering mechanism and motion transmitting means connecting said leaf spring and said registering mechanism.

8. In a device of the class described the combination of a scale casing, a platform and a registering dial closing the top of said casing and lying in a common plane, a plurality of horizontally disposed levers in said casing, a leaf spring pivotally mounted in said casing, said pivotal mounting having a depending arm, a threaded screw adapted to engage and adjust the position of said arm, and adjustable stops adapted to limit the movement of said arm, registering means for said dial, a frictionless connection between said leaf spring and said horizontal levers, and a motion transmitting means connecting said leaf spring and said registering mechanism.

9. In a device of the class described the combination of a casing, an extension therefrom, said extension and casing being relatively shallow, a scale platform closing the top of said casing and registering dial closing the top of said extension and lying in a common plane with said platform, a plurality of horizontal levers pivotally mounted and depending from said casing, a leaf spring carried by said casing and overlying said levers, a frictionless connection between said levers and leaf spring whereby said levers are hung therefrom, a bell crank lever pivotally mounted in said casing and shifting in a vertical plane, a rack bar connected to the upper end of one arm of said bell crank lever, a pinion engaging said rack bar, said pinion having a shaft and a registering pointer thereon, a coil spring normally pulling said bell crank lever in one direction, a link connecting the other arm of said bell crank lever with the free end of said leaf spring, said link including an adjustable connection for varying the throw of the bell crank lever.

10. In a bathroom scale the combination of a low, shallow casing of substantial length and breadth as compared to its height, a scale platform closing the top thereof and of corresponding dimensions, a registering dial carried by said casing, a leaf-spring mounted within the casing, means connected with said spring for carrying said scale platform, registering mechanism for the dial, and motion transmitting means connecting said leaf-spring and said registering mechanism.

11. In a bathroom scale the combination of a casing having a scale platform and a registering dial, registering mechanism carried by said casing, means for shiftably mounting said platform on said casing, said means including a leaf spring carried by said casing and motion transmitting connections from said leaf spring to the registering dial.

MATHIAS J. WEBER.